April 10, 1962

R. W. DEWEY ETAL 3,029,417

PRODUCTION ANALYZER

Original Filed July 23, 1956

INVENTORS
Rex Ward Dewey
Alan Norwich
by Anthony D. Cennamo

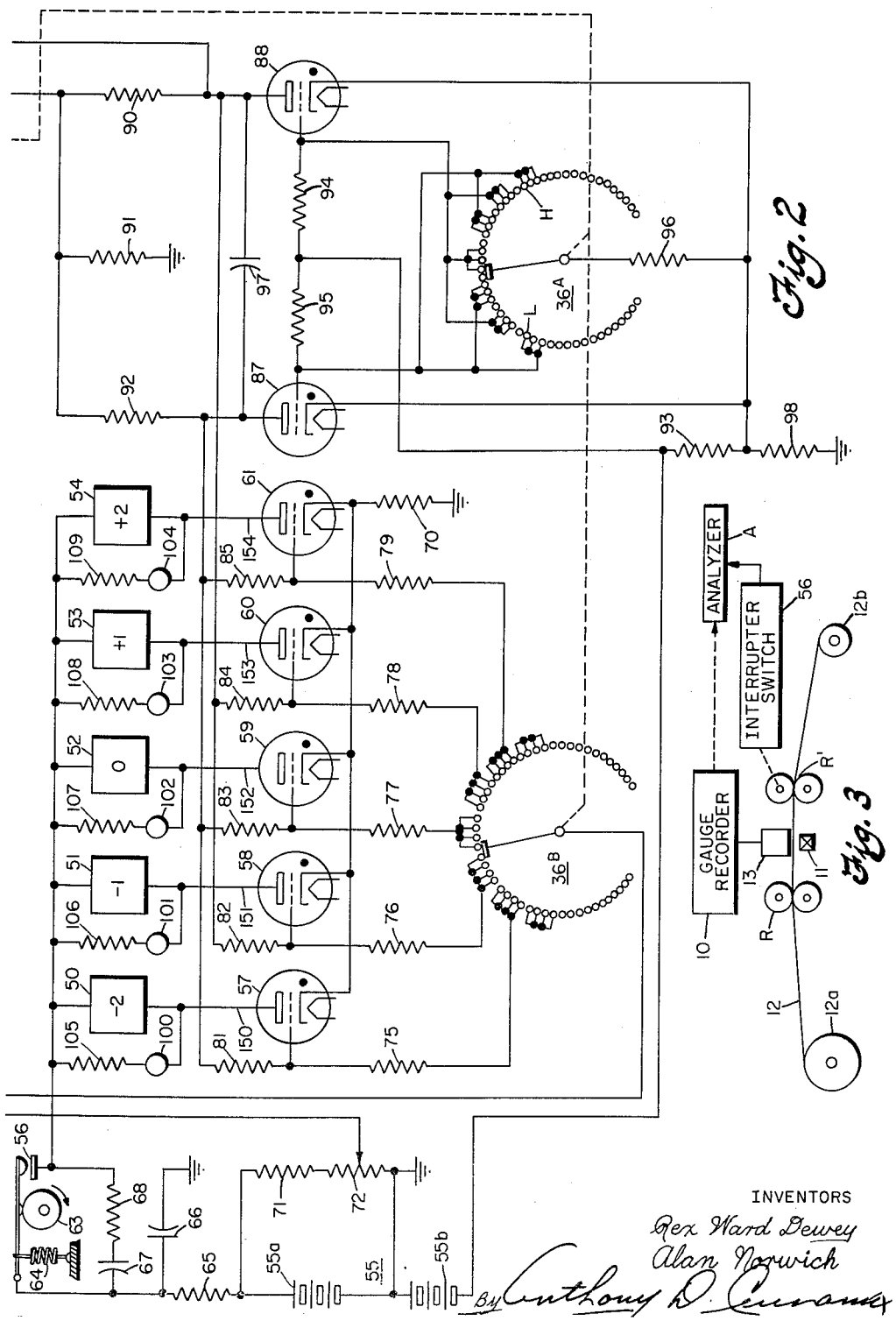

United States Patent Office 3,029,417
Patented Apr. 10, 1962

3,029,417
PRODUCTION ANALYZER
Rex Ward Dewey, Columbus, and Alan Norwich, Delaware, Ohio, assignors to Industrial Nucleonics Corporation, Columbus, Ohio, a corporation of Ohio
Original application July 23, 1956, Ser. No. 599,393, now Patent No. 2,964,707, dated Dec. 13, 1960. Divided and this application June 24, 1959, Ser. No. 822,576
12 Claims. (Cl. 340—178)

This is a division of our co-pending application Serial No. 599,393, filed July 23, 1956, now Patent No. 2,964,707.

This invention relates generally to indicating systems, and more specifically it relates to electronic apparatus for use in conjunction with a measuring instrument to automatically provide the data for statistical analysis of a manufacturing process.

It is important in mass production industries to maintain a necessary uniformity of the product. The degree of uniformity actually obtained is best expressed statistically, for example, in terms of the well-known measure of dispersion referred to as the standard deviation or "sigma."

The basis for a calculation of sigma is the well-known table of data referred to as a frequency distribution. To obtain a frequency distribution, each item in a large group thereof is independently measured to determine the individual values of a property of interest common to all the items. The range of values so obtained is then divided into appropriate class intervals. The frequency distribution comprises a list of the class intervals correlated with the number of items whose measured value is included in each class interval.

In the past a great deal of labor has been expended in making the numerous necessary measurements and classifying the large amount of resulting data. However, in recent years great progress has been made in the development of automatic gauging, weighing and testing apparatus for providing high speed measurement and recording of all kinds of process variables. The present device is for use primarily in connection with such measuring apparatus, and serves to translate the readings of the instrument directly into a frequency distribution which is presented on suitable counters in a reliable and automatic manner.

In accordance with this invention, a series of items issuing from a production line, or passing through an inspection line, are individually and successively presented to an automatic measuring device responsive to a property of interest common to the items in a lot thereof. By a well-known method, each indication provided by the measuring device is translated into an electrical voltage proportional to the measured value of the said property, or alternately it may be translated into a voltage proportional to the difference between the measured value and a preselected target value, or optimum value.

In turn a conventional electro-mechanical servomechanism is employed to convert the voltage value into a proportional positioning of a selector switch having a contact or group of contacts corresponding to each class interval in the desired frequency distribution. Thus as each individual item is presented to the measuring device or gauging means, the selector switch is automatically located in a position corresponding to the measured value of the property of interest in that item.

At this instant an electrical pulse is automatically generated to signal the accomplishment of a measurement. It is desired to register this pulse on a suitable counter corresponding to the class interval which includes the value obtained in the measurement of the item. It is the purpose of the selector switch to effect the routing of the pulse to the proper counter in a plurality thereof, since an individual counter is provided for each class interval in the frequency distribution.

Given a pulse source, a plurality of counters, a transmission line for conducting pulses to each counter and a selector switch whose position specifies the route of each pulse to the proper counter, it would appear that the routing of the pulses is a matter of great simplicity, requiring only the connection of the switch wiper to the pulse source and the connection of the transmission lines to the proper contacts of the switch.

However, in such an apparatus, it is found that if the switch employs a wiper which is narrower than the space between successive contacts, there are certain positions of the switch wiper which result in an open circuit, so that a pulse may not be routed to any transmission line. On the other hand, if the switch employs a wiper which is wider than the space between successive contacts, there are certain positions of the wiper wherein the same can make two connections at once, so that a pulse might be impressed on two transmission lines at once. Even if it were possible to construct a theoretical ideal switch which would not bridge two contacts at once, and wherein the open circuit movement would be infinitely small, a single pulse could be propagated on two transmission lines if the wiper happened to move from one contact to the next in the finite period of time determined by the duration of the pulse.

To prevent such ambiguity in accordance with this invention, the pulses from the pulse source are not routed through the contacts of the switch per se. Rather, each transmission line is connected to the pulse source by means of a gate, which determines whether a pulse generated by the pulse source is blocked or propagated onto the respective transmission line in accordance with the presence or absence of a control signal at the control input of the gate.

The presence of absence of the control signal on the input of each gate is in turn determined by the position of the selector switch. In order to secure the advantage of the shorting switch wiper, which prevents the open circuit condition, together with the advantage of the non-shorting switch wiper which prevents making two connections simultaneously, two ganged switch sections are used. One section employs the shorting contact principle, while the other operates as a non-shorting switch.

In order to avoid the associated disadvantages of the respective shorting and non-shorting switch sections, neither section is allowed to control the gates independently. On the other hand, the control signal required to operate the gates is not delivered thereto as an entity, but is separated into two essential components. The first component of the control signal may be provided by either of the two outputs of a bi-stable element or "flip-flop."

The gates are divided into an even group and an odd group. The two outputs of the flip-flop are connected so as to deliver the said first component of the control signal to the even group when the flip-flop is in one stable state, and to alternatively deliver the same to the odd group when the flip-flop is in the other stable state. Similarly the contacts on the first (non-shorting) switch section are connected to form even and odd groups. These contacts and the cooperating non-shorting switch wiper are connected into the trigger circuits of the flip-flop, so that when the wiper makes connection with a contact in the even group, the flip-flop is placed in one stable state. If a movement of the wiper places the switch in open-circuited condition while the wiper crosses the gap between even and odd contacts, the same stable state is still maintained, due to the nature of a bistable device. However, when further movement of the wiper causes the same to connect with an adjacent contact in the odd group, the flip-flop will change its condition to the other stable state. Thus the first component of the control signal is always available to either all the even gates or all the odd gates, but never to an odd gate and an even gate simultaneously.

The second component of the control signal is routed to the control inputs of the gates through the second (shorting) switch section, which generally presents this component to only one gate, although two adjacent gates may receive the signal component when the switch wiper is in position to overlap adjacent contacts connected to different gates. However, the sequence of the gates is such that the gate adjacent to an even gate is always an odd gate, and vice versa. Therefore, since the first component of the control signal is never available to an odd gate and an even gate simultaneously, and since both components of the control signal are required to operate a gate, only one of the two gates selected by the shorting switch section is capable of propagating a pulse onto its connected transmission line.

In the preferred embodiment of the invention described hereinafter, the various gates and the flip-flop circuit employed comprise electronic discharge devices, which permit the gate switching functions to be accomplished in a substantially instantaneous manner. This system has a further advantage in that the transmission of a pulse through a gate may be employed to develop a bias voltage for all the other gates. Thus the pulse source may be allowed to generate pulses of a duration sufficient to actuate utilization devices (e.g., electromagnetic counters) characterized by relatively slow response, and at the same time only one transmission line may receive a given pulse even though a slight movement of the switch should cause the flip-flop to change from one state to the other during the duration of the pulse.

The use of an electromechanical servomechanism to drive the selector switch has several important advantages. Firstly, it prevents any adverse effect on the gauge measurement functions which might otherwise occur due to electrical interaction or excessive mechanical drag on the indicating and recording mechanism. Secondly, it allows for infinitely variable boundaries between class intervals which are resettable by one simple adjustment, that is, by changing the electrical sensitivity of the balancing voltage feedback system of the servo. Other advantages will be apparent from the description given hereinafter.

For purposes of explanation, the use and operation of one apparatus in accordance with the invention will be illustrated and described in connection with a radiation thickness gauge measuring a continuous sheet material process. Herein the items measured are arbitrary unit lengths (e.g., yards) of the sheet material passing the gauge in a continuous flow. The measured property is the weight per unit area of the sheet. Electrical pulses for triggering the recording counters are generated by the closing and reopening of an interrupter contact which occurs each time a unit length of material passes under the gauging head. To this end, there may be provided a stationary-mounted "contactor cart" which includes one or more wheels in driving contact with the traveling sheet. Within such a cart, a set of electrical contacts may be arranged to close and reopen each time the wheels make one revolution. Thus if the wheels are one yard in circumference, for example, a pulse is generated for each yard of material whose thickness is measured by the gauge. For each pulse generated, one of the counters employed to record the frequency distribution will advance its reading by one unit. Thus at the end of a production run, the various counters show the total number of yards of material whose measured thickness falls within the range of each weight subdivision employed in the desired frequency distribution.

The apparatus described herein may be termed a "Production Analyzer." The data provided by the production analyzer may be used in mathematical evaluations for such purposes as establishing realistic tolerances, etc. The analyzer may also be used as an engineering tool for showing the effects of various machinery and process modifications on the frequency distribution. It also serves as a continuing report on certain factors affecting the condition of the processing and control equipment, helping to enable a shutdown for repairs to be scheduled at a most opportune time rather than having to be dealt with in an unforeseen emergency. It can also be used to compare and evaluate the performance of different production crews or that of the same crews on different work shifts.

The general objects of the present invention are to provide a production analyzer which shows the total number of items of a manufactured product which conform to certain specifications as determined by a suitable gauge; to provide a production analyzer which will not adversely affect gauge measurements either by electrical interaction or by imposing an excessive mechanical drag on the indicating and recording mechanism; to provide a production analyzer which has a convenient means of setting the product specification target, and which provides a visible, direct indication of the target setting; to provide a production analyzer which has easily variable class interval bandwidths and which provides a direct method for indicating the location of interval boundaries; to provide a production analyzer which will not skip counts on a borderline or when transferring from one counter band to another; to provide a production analyzer which will not allow two counters to be tripped simultaneously; to provide a production analyzer which will not, after one counter is tripped, allow a second counter to be tripped if the boundary between two counter bands is crossed during the time interval between the rise and fall of a single pulse; to provide a production analyzer in which the band limits, once set, are not subject to shifts due to temperature changes or aging of components; to provide a production analyzer in which all electronic tubes can be of the same type and interchangeable; to provide a production analyzer which has a counting speed adequate for the types of processes to which it may be applied; to provide a production analyzer which uses standard industrial components throughout; and to provide a production analyzer which is stable in operation and highly efficient in its intended use.

In order to consummate the above objects, it is another important object to provide electronic apparatus for unambiguously distributing a succession of electrical pulses among a plurality of transmission lines in accordance with the position occupied by a selector switch at the time of arrival of each pulse.

Other objects and advantages of the present invention will become apparent from the following description and accompanying drawings in which:

FIGURE 2 is a circuit daigram showing the selector mechanism portion of a production analyzer which may be used in conjunction with the circuit shown in FIGURE 1 to form a complete production analyzer system.

FIGURE 3 is a sketch showing the manner in which the invention may be utilized in a system for automatic inspection of sheet material.

Figure 1:
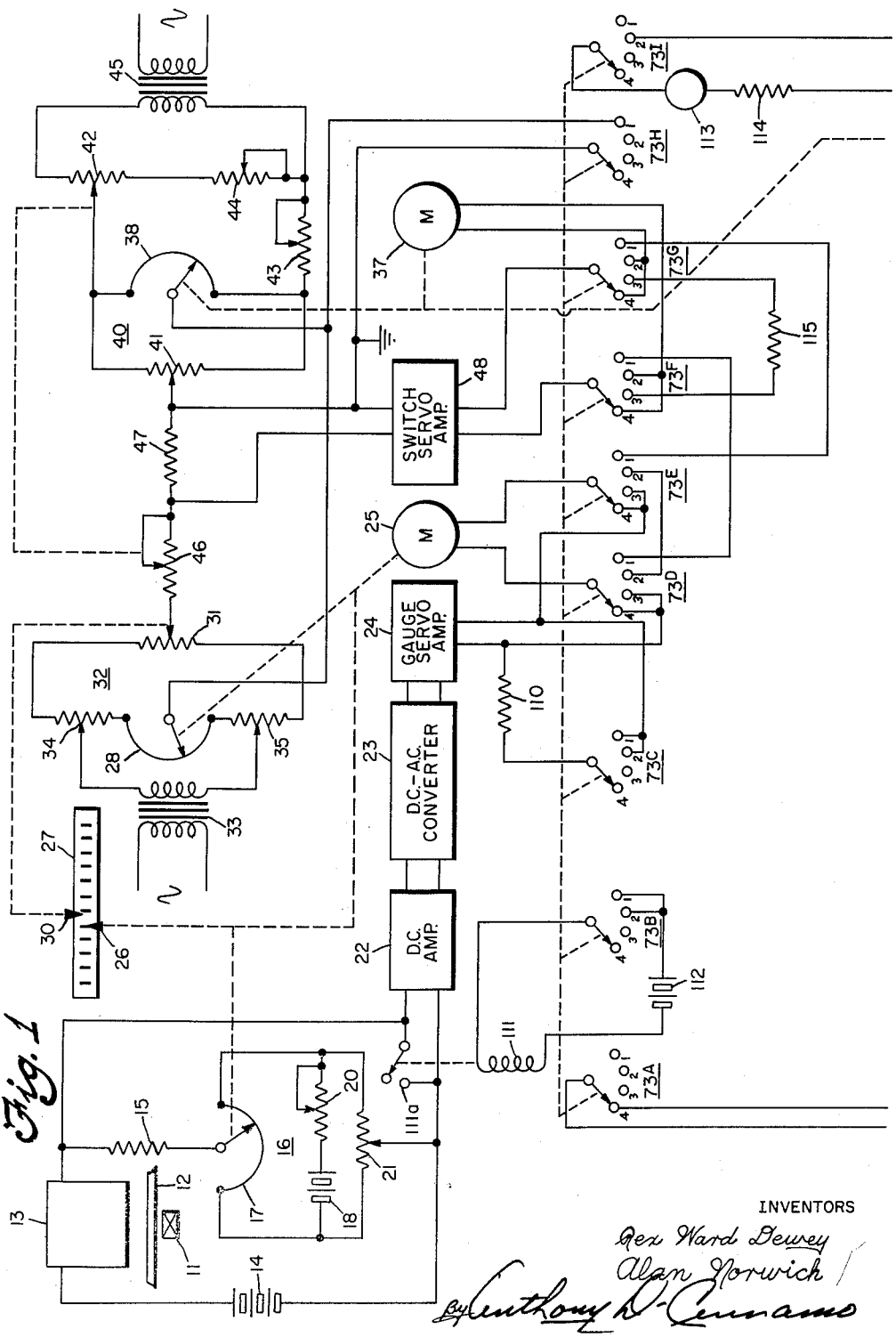
FIGURE 1 is a circuit diagram showing the manner in which a production analyzer formed in accordance with the present invention may be coupled to a radiation gauge.

A radiation gauge comprising elements indicated by the numerals 10—27 is schematically represented in FIGURE 1 of the drawings. This gauge forms no part of the present invention and is presented merely to illustrate a typical application of a production analyzer.

Referring to FIGURE 3, in general the gauge comprises a recorder 10 adapted to continuously record the intensity of radiation from a radiation source 11 which penetrates a traveling sheet 12 and impinges on a radiation detector 13. The recorder 10 may be suitably calibrated to indicate the detected radiation in terms of sheet thickness.

The traveling sheet to be inspected and analyzed may be supplied from a coil 12a of sheet material. The sheet may be presented to the gauge for measurement thereby by providing two pairs of spaced guide rolls R and R' which guide the sheet 12 through the gap separating the source 11 and detector 13. After the sheet has passed through the gauge, it may be rewound into another coil 12b.

In order to express the thickness uniformity of the sheet 12 in statistical terms, each yarn of material in the coil 12a is considered as a unit or single item which is individually measured as it passed through the source-detector. Accordingly, there may be provided an interrupter switch 56 mechanically driven by rolls R' in contacting relation to the sheet 12. The interrupter switch is adapted to close an electrical circuit and thereby provide an electrical pulse each time a yard of material passes through the source-detector. These pulses and the gauge indication are processed by the analyzer A of the present invention to provide the statistical frequency distribution in a manner now to be described, with reference again to FIGURE 1 and FIGURE 2.

Radiation is emitted from a source 11, and a portion of this emitted radiation is transmitted through the material 12 which is to be analyzed and falls on a detector 13 causing a current to flow through a battery 14, and a high-meg or load resistor 15 developing a voltage across the latter. This voltage is compared with the bucking output voltage of a bridge circuit 16. The bridge circuit includes a motor driven slidewire 17, a voltage source 18, a potentiometer 20 for adjusting the sensitivity of the bridge, and a "center scale" potentiometer 21 which sets the operating point about which the slidewire voltage varies.

The detector 13 also connects in the usual fashion with an impedance matching direct current amplifier 22. Whenever there is a difference between the bucking bridge voltage output and the voltage across the high-meg resistor 15, a signal appears at the input of the D.C. amplifier 22. After amplification, this signal is transmitted to a suitable converter 23 which changes the signal into an A.C. voltage which in turn is amplified by a suitable alternating current amplifier 24, the output of which connects with a servo motor 25 which drives the wiper of the slidewire 17 to a point of balance, and at the same time drives a measuring indicator or arm 26, and if desired, a recorder pen (not shown) across a suitable scale 27 graduated in units of weight per unit area. A suitable calibration of the instrument can be made by an appropriate adjustment of the potentiometers 20 and 21.

In order to attach the production analyzer of the present invention to the radiation gauge circuit, a repeat slidewire 28 is mechanically coupled to the servo motor 25 and measuring slidewire 17 so that its wiper moves in angular synchronism with the movement of the measuring slidewire.

A target indicating pointer 30 which is adjustable by the gauge operator is provided to indicate the specification weight at which the operator desires to control the product material. This pointer 30 is coupled to a target potentiometer 31 so that an adjustment of the target pointer will simultaneously adjust the target potentiometer.

The repeat slidewire 28 and the target potentiometer 31 are connected in a bridge circuit 32 fed from the low voltage secondary of a transformer 33. By means of potentiometers 34 and 35 on either side of the repeat slidewire, the target potentiometer 31 and the repeat slidewire 28 may be matched electrically so that when the measuring indicator 26 is in exact alignment with the target pointer 30, the arms of the slidewire 28 and the target potentiometer 31 will be at the same potential and there will be no output from the bridge 32. However, if the measuring indicator 26 is not in alignment with the target indicator 30, there will be a voltage output from the bridge 32 whose magnitude varies with the extent of the deviation and having one of two directly opposite phases depending on the direction of the deviation. This signal is the input to what properly constitutes the analyzer circuit of the present invention.

As previously indicated, this example of an input derived from a radiation weight gauge measurement is merely illustrative and it will be realized that any one of a number of types of continuous measuring devices used to measure any kind of variable quantity could be coupled to the analyzer in a similar way.

In the disclosed system, the input to the analyzer is an A.C. signal voltage appearing between the wipers of the slidewire 28 and the target potentiometer 31. The magnitude of this voltage is proportional to the difference between the weight indication rendered by the gauge and the set indication represented by the position of the target pointer 30. The signal voltage will, as above mentioned, have one of two directly opposite phases depending on the direction of the deviation.

The first function of the analyzer is to translate the signal voltage into a proportional positioning of a motor driven ganged selector switch 36 A—B. Accordingly, the switch 36 A—B is mechanically coupled to a servo motor 37 and a driven slidewire 38 which controls the output of a balancing voltage source.

The balancing voltage source comprises a bridge circuit 40 whose arms are made up of the slidewire 38 and a potentiometer 41. This bridge circuit is fed by a potentiometer network 42, 43, and 44 from the low voltage secondary of a transformer 45.

To prevent extraneous voltage from feeding into the bridge circuits 32 and 40 by way of the capacitive coupling between the transformer windings, the end of each transformer primary winding which lies adjacent to the secondary winding should be connected to the common unswitched or grounded side of the A.C. power line.

The variable balancing voltage appearing between the wipers of the slidewire 38 and the potentiometer 41 is properly phased and connected in series with the A.C. signal input to the analyzer. The wipers of the repeat slidewire 28 and the switch servo motor operated slidewire 38 are directly connected. The wipers of the target potentiometer 31 and the potentiometer 41 are connected through a voltage divider consisting of potentiometer 46 and resistor 47.

Thus, if there is any difference between the input signal voltage and the balancing voltage, there will be a net A.C. voltage appearing across the resistor 47. This difference voltage is amplified by a switch servo amplifier 48 to drive the switch servo motor 37, which in turn will move the slidewire 38 in a direction so as to achieve a null-balance condition wherein the voltage between the wiper of slidewire 38 and the potentiometer 41 is equal and opposite to the voltage between the wiper of the repeat slidewire 28 and target potentiometer 31.

In this system, each movement of the measuring indicator 26 with respect to the target indicator 30 will result in a proportional movement of the slidewire 38 and the arms of the switch 36 A—B.

The voltage appearing across the balancing bridge may be varied by adjusting the potentiometer 42. If this bridge voltage is adjusted high, a small change in the position of the slidewire 38 will cancel a proportionately large change in the position of the slidewire 28. Conversely, if the bridge voltage is adjusted low, it may require a relatively large movement of the slidewire 38 to cancel the effect of a proportionately small movement of the slidewire 28.

The desired proportional movement of the switch wiper arms may be represented by the ratio $\Delta r/\Delta e$, where $\Delta e$ represents an incremental change in the signal voltage produced by an incremental movement of the measuring indicator 26 with respect to the target indicator 30, and Δr represents a corresponding change in the position of the wipers. This ratio Δr/Δe is variable by means of potentiometer 42, which controls the electrical sensitivity of the balancing voltage feedback system of the servo, and hence the "bandwidth" of the analyzer system.

Potentiometer 41 provides a centering adjustment for the switch 36 A—B. When there is no input voltage into the analyzer (e.g., when the measuring indicator 26 and target indicator 30 are in alignment and the wipers of the slidewire 28 and potentiometer 31 are at the same potential), the arms of the switch 36 A—B should be centered. Under the condition of no input voltage, the slidewire 38 will be driven automatically to the point where there is no balancing voltage between the wipers of the slidewire 38 and the potentiometer 41. This balance point can be shifted electrically by an adjustment of the potentiometer 41 for any slight misalignment in the mechanical hookup between the slidewire 38 and the switch 36 A—B, as well as any slight mechanical-electrical asymmetry due to such factors as residual resistances in potentiometers or slidewires.

The common procedure in statistical analysis is to measure discrete values, in unit samples, of some variable property of interest. These values may be expected to vary over a continuum. In quality control, this continuum is considered to extend in both directions from the ideal value of the measured property. On the negative side of this ideal value, the continuum extends in the direction of an increasing deficiency of this property. On the positive side, it extends in the direction of an increasing excess of the measured property. To make a frequency distribution, this continuum is arbitrarily divided into an odd number of equal class intervals so that the middle interval has its center near the ideal value. As each sample is measured, it is tallied in the proper interval which includes the value of the measured property determined for that particular sample.

In the illustrated system, five class intervals have been used. The tallies are made on suitable magnetic digital counters 50, 51, 52, 53, and 54. Additional counters and actuating circuitry may, of course, be added as necessary depending on the number of class intervals desired in the frequency distribution.

The notation "0" on counter 52 indicates the middle interval counter, whereas the numbers on the remaining counters indicate respective intervals above and below the middle or what might be termed "on specification" band.

The digital counters 50—54 may be of the conventional electromagnetic type which advances its reading one digit when a suitable voltage pulse is applied to its operating solenoid. An example of a suitable counter for use in the circuits shown is the "Sodeco Geneve" type TCeF5E which is distributed by Landis and Gyr, Inc., New York, New York.

Each of the counters 50—54 is connected in a circuit which includes a common source of electrical pulses, an individual transmission line for each counter, and a gate for each transmission line which determines whether a pulse generated by the pulse source is blocked or propagated on its respective transmission line so as to actuate the corresponding counter.

In the illustrated circuit, the pulse source basically comprises a unidirectional voltage source represented by the battery 55a which furnishes a positive B+ voltage (e.g., +120 volts) with respect to ground and an interrupter contact 56. Each of counters 50—54 is connected in circuit with the pulse source through a respective transmission line comprising a conductor in the group 150—154.

Each of the transmission lines 150—154 is headed by a gate comprising a thyratron control tube in the group 57—61. Each thyratron gate is connected to the grounded terminal of the pulse source through the common cathode resistor 70 and the conventional ground return path.

In the illustrated structure, the interrupter contact 56 has a movable arm which is maintained in engagement with the peripheral surface of an eccentrically mounted wheel 63 by a biasing spring 64. The interrupter contact 56 closes and reopens each time the wheel 63, which is in driving contact with the sheet material being measured, makes one complete revolution. A resistance 65 is connected between the power supply 55 and the movable arm of the interrupter contact 56 and a capacitor 66 is connected between the end of the resistor 65 which connects with the movable arm of the interrupter contact 56 and ground to provide a filter for attenuating any alternating current which might otherwise build up in the system. A condenser 67 and resistor 68 are connected in series across the contact 56 to suppress sparking.

A counter cannot be actuated unless the interrupter contact 56 is closed and the thyratron control tube associated with that counter is able to conduct current. The circuit is completed through the common cathode resistor 70, ground return and one side of the power supply which furnishes a positive B+ voltage (e.g., +120 volts) with respect to ground.

A portion of the B+ voltage supply is applied across the dropping resistor 71 and potentiometer 72 to provide a positive voltage (e.g., +35 volts) which is used to apply a positive biasing potential to the control grids of the counter tubes 57 through 61. The circuit is completed through one section 73A (see FIGURE 1) of a set-up switch and through the arm of the servo switch 36B to either a single control tube or to two adjacent control tubes simultaneously. Grid resistors in this circuit are shown at 75, 76, 77, 78, and 79.

Means are also provided whereby a source of negative biasing potential may be applied to the control grids of the control tubes 57 through 61. This voltage is obtained from the negative side of the power supply 55 which provides a B— voltage (e.g., —120 volts) with respect to ground. A portion of this voltage is impressed on the control tube grids through resistors 81, 82, 83, 84, and 85. The resistors 81, 83, and 85 connect with the plate of a thyratron 87, and the resistors 82 and 84 connect with the plate of a thyratron 88.

The portion of the circuit which includes the thyratron tubes 87 and 88 and the trigger circuits thereof, which are connected to switch section 36A, will be recognized as an adaptation of a thyratron "flip-flop" circuit.

All circuitry associated with the thyratrons 87 and 88 operates at a negative potential with respect to ground. One or the other of these thyratrons will be firing or conducting current at any given time.

Assume that the thyratron 88 is firing. The current flowing in its plate circuit will produce a voltage drop across an associated plate resistor 90, and a load resistor 91 which is common to both of the tubes 87 and 88. The plate voltage of the thyratron 88 which is firing is (with respect to ground) the sum of the voltages across the resistors 90 and 91 (e.g., —100 volts). Since the thyratron tube 87 is not firing and there is substantially no current through an associated plate resistor 92, the plate voltage of thyratron tube 87 with respect to the ground is the voltage across the resistor 91 (e.g., —35 volts).

Now consider the voltages at the control grids of the control tubes. On the even numbered tubes, there is a high negative potential (e.g., —100 volts) applied to the top of the control grid resistor. On the odd numbered tubes, there is a much lower negative potential (e.g., —35 volts) similarly applied. Either of these voltages is ordinarily more than sufficient to prevent the thyratron from firing. However, by means of the servo switch 36B, a positive voltage is applied to the bottom of the grid resistor or resistors which connect with the portion of the servo switch which is contacted by the switch arm.

In FIGURE 2, a positive voltage is shown as being applied to the bottom of the grid resistors 76 and 77 simultaneously. This voltage is preadjusted to a value substantially equal and opposite to the negative voltage derived from the voltage drop across resistor 91. The voltages of the grids of the counter tubes shown in FIGURE 2 may, therefore, be somewhat as follows:

| Tude | Grid Volts to Ground |
|---|---|
| 57 | $-35 + 0 = -35$ volts. |
| 58 | $\frac{-100 + 35}{2} = -32.5$ volts. |
| 59 | $-35 + 35 = 0$ volts. |
| 60 | $-100 + 0 = -100$ volts. |
| 61 | $-35 + 0 = -35$ volts. |

Thus, the only counter tube capable of firing when the plate circuit is closed by the interrupter contact 56 is thyratron 59. If the interrupter contact 56 is closed at this instant, the counter 52 will be energized, increasing the reading on this counter by one unit.

It will be apparent from the above that all the thyratron gates are normally biased into a non-conducting state by the voltage which is always developed across load resistor 91, and that in order for a gate to conduct and thereby pass a voltage pulse to the connected transmission line and counter, a control signal sufficient to overcome said bias must be provided. The necessary control signal is provided in the form of two essential components.

The first component of the control signal is provided by the voltage drop which occurs across one or the other of the plate load resistors 90 or 92 of the flip-flop thyratrons when the respective thyratron is conducting current.

The second component of the control signal appears between the variable arm of potentiometer 72 and ground, and is impressed on the wiper of switch section 36B.

The control grid resistor pairs 75 and 81, 76 and 82, 77 and 83, 78 and 84, 79 and 85 each constitutes means for combining the first and second control signal components to thereby deliver the required control signal to the appropriate gate input, that is, to the thyratron grid selected to receive the control signal in accordance with the position of the selector switch wipers.

After one of the thyratron tubes 57 through 61 is activated or fired, it will continue to operate regardless of the potential on its grid, until its plate circuit is opened. The solenoid of its associated counter will, therefore, remain energized until the interrupter contact 56 reopens.

It will be noted that when any of the control tubes 57 through 61 is firing, the voltage drop across the common cathode resistor 70 causes all counter control tube cathodes to assume a positive potential with respect to ground. This means that a negative voltage (e.g., $-20$ volts) is added to the bias existing on the control grids of all of the control tubes. Therefore, while one tube is firing, no other tube is able to fire regardless of any movement of the arm of the servo switch section 36B. For this reason, and because of the fact that a counter solenoid must be de-energized and re-energized in order to be in condition to register another count, only one count can be registered for each closure of the interrupter contact 56.

Referring now to the flip-flop circuit which includes thyratron tubes 87 and 88, one tube or the other will be conducting current, the other tube being kept nonconducting by a negative bias voltage developed across a resistor 93 and applied to the control grid through a resistor 94 or 95.

The function of the switch section 36A is to effect the initial firing of one or the other of the thyratron tubes 87 and 88 by completing the associated trigger circuit; that is, by shunting the grid of the selected tube to its cathode through resistor 96, thereby reducing the negative potential on the grid to below the firing point. Once fired, the thyratron will continue to conduct even though the circuit through the switch 36A is open. The value of the resistor 96 is chosen to maintain a slight negative bias on the grid of the conducting thyratron to keep its grid current at an appropriate value for continuous conduction of the tube.

When the wiper of the switch section 36A is traveling over the unwired contact between two groups of wired contacts, there is a small gap over which no electrical contact is made. During this non-shunting movement, whichever tube has been fired will continue to fire. After the switch wiper has crossed the gap, however, to make connection with the next set of three wired contacts which are connected to the grid of the opposite thyratron, the other thyratron will fire. This immediately cuts off the thyratron which was originally firing.

Assuming that the thyratron 88 was conducting and that now thyratron 87 starts to conduct, a negative voltage pulse is transmitted through a capacitor 97 to the plate of the thyratron 88, effectively canceling the already low voltage which was maintained across this thyratron. The thyratron 88 is thus allowed to de-ionize so that its grid can recover control.

This action, and the complementary action which will return the thyratrons to the original described condition, occurs alternately as the wiper of the switch section travels from one set of contacts to the next set of contacts.

The "shorting" contacts of switch section 36B render a "coarse" and sometimes overlapping selection of counter tubes, whereas the "non-shorting" contacts of switch section 36A determine the exact point of transfer from an odd interval band to an even band and vice versa. It is apparent also that the boundaries between the class intervals, when the servo switch 36A–B is traveling in one direction, will slightly overlap the boundaries when the switch is traveling in the opposite direction. However, in the worst case, using only five counters, this overlap is only about one half of one percent of the total analyzer bandwidth, and would not be expected to have any statistical significance whatever.

A bleeder resistor 98 is provided so that a negative bias is available for the grids of the thyratrons 87 and 88 before the tubes warm up after power is applied to the system. Since this bias voltage is developed across resistor 93, there would otherwise be no bias until a tube started to conduct.

Suppose that the grid of the thyratron tube 88 was shunted to its cathode, and that the thyratron tube 87, having no bias on its grid, warmed up first. Tube 87 would fire. Then as tube 88 warmed up, since its grid would be shunted by the wiper of switch section 36A, it would gradually build up a plate current also, but slowly, so that the normal sharp voltage pulse across the capacitor 97 would not occur. Both thyratron tubes would then continue conducting at the same time, rendering the analyzer inoperative.

For the convenience of the operator, neon lights 100 through 104 are connected across the counters 50 through 54, respectively, to give an indication as to which counter is operating at the time of observation. Resistors 105 through 109 are provided to limit the voltage across the neon lights to the desired value.

In the preceding explanation, the operation of the analyzer was described with the set-up switch 73 in position 4, or counting position. The particular arrangement illustrated for use with a continuous recording radiation weight gauge provides a convenient method for rapidly and accurately setting up the analyzer.

Position 1 of the set-up switch 73 facilitates the adjustments necessary to secure accurate "tracking" of the repeat slidewire 28 and the target potentiometer 31. This means that when the measuring indicator 26 is located at any point on scale 27, the voltage derived from the arm of the repeat slidewire 28 is equal to the voltage which would be derived from the arm of the target potentiometer 31 if the target indicator 30 were located at that point.

This desired condition is obtained in a very simple manner when the set-up switch is turned to position 1. Connections are then as follows:

(1) Section 73H short-circuits the output of the balancing bridge 40 by connecting the wiper of slidewire 38 to the wiper of potentiometer 41.

(2) Sections 73D, E, F, and G disconnect the output of the switch servo amplifier 48 from the servo switch motor 37 and connect it to the servo motor 25 in the gauge recorder.

(3) Section 73C connects a resistor 110 across the output of the gauge servo amplifier 24 to simulate the load on the output stage normally provided by the servo motor 25.

(4) Section 73B energizes a "clamp" relay 111, which short-circuits the input to the D.C. amplifier by connecting the relay to a battery 112.

A visual indication of tracking now appears on the instrument recorder, since the pen motor will drive the repeat slidewire to a point of balance where the potential at the arm of slidewire 28 is equal to the potential at the arm of target potentiometer 31.

Therefore, if the target pointer 30 is moved to any point on scale 27, the measuring pointer 26 should automatically follow it to substantially the same point. If this is not the case, proper tracking is secured by adjustment of potentiometers 34 and 35, by which means the electrical alignment of 28 and 31 is made to match their mechanical alignment.

Position 2 of the set-up switch 73 facilitates the adjustment of servo switch centering and bandwidth.

The switch centering adjustment is made as follows. First the set-up switch 73 is thrown to position 1. This automatically causes the measuring indicator 26 to come into alignment with the target indicator 30 and causes the wiper of the repeat slidewire 28 to be brought to the same potential as the wiper of the target potentiometer 31. The set-up switch is then thrown to position 2.

In position 2, the following circuit changes are effected:

(1) Sections 73D and E short the sense winding of the servo motor 25. The bridge circuit which includes the repeat slidewire 28 and target potentiometer 31 will remain at balance, as set up in position 1.

(2) Sections 73F and G connect the output of switch servo amplifier 48 to the switch servo motor 37.

(3) Section 73H unshorts the output of the balancing bridge 40.

(4) Section 73I connects a neon lamp 113 and resistor 114 across resistor 90, so as to be illuminated when thyratron 88 is firing.

The repeat slidewire bridge 32 being balanced, the switch motor 37 will now drive slidewire 38 to a point where the bridge 40 is balanced. This balance point should be such that the servo switch 36A-B is centered (vertical) in the zero deviation band. If not, it can be centered by an adjustment of potentiometer 41.

The bandwidth of the analyzer is adjustable by means of potentiometer 42, which is equipped with a graduated dial. Since the recorder chart of the measuring instrument is normally marked off into 100 equal divisions, it is convenient to make the bandwidth control dial calibration in terms of percentages of the full scale reading.

For example, assume that the analyzer is to be calibrated so that the five class intervals represented by the five counters may be adjusted so as to encompass any desired total bandwidth from 5% to 100% of full scale reading. Accordingly, the graduated dial on potentiometer 42 is marked off in these percentages, so that maximum voltage is delivered to the bridge when potentiometer 42 is set to the 100% mark.

With the dial set to 100%, the low or high limit of the analyzer bandwidth should be reached when the measuring pointer deviates 50 chart divisions from the position of the target pointer 30. Accordingly, the target pointer 30 is adjusted to this distance from the measuring pointer. Potentiometer 43 is now turned to secure maximum bridge voltage, then gradually in the opposite direction. The motor driven servo switch 36A-B will gradually deviate further from its center position until its wiper on 36A makes connection with contact L or H, the bandwidth limit, and the set up light 113 goes out. This secures the calibration of the 100% end of the dial.

With the dial on 42 set to 5%, the target pointer is set to deviate 2½ chart divisions from the measuring pointer. Potentiometer 44 is turned to obtain maximum bridge voltage, then gradually in the opposite direction until the light 113 goes out as before. This secures the calibration of the 5% end of the dial.

Note that potentiometer 46 is mechanically coupled to the bandwidth control potentiometer 42. This feature makes it unnecessary to readjust the gain of the switch servo amplifier 48 when changing from a narrow bandwidth to a wide bandwidth, and vice versa. When the bandwidth is wide, a small deviation of slidewire 38 from the null point produces a relatively large difference between the input signal voltage and the balancing voltage, so that there would be a tendency toward oscillation (hunting) of the switch servo motor 37. This condition is corrected by increasing the resistance of potentiometer 46, thereby attenuating the input voltage to the amplifier 48. When the bandwidth is narrow, a large deviation of slidewire 38 from the null point produces a relatively small difference between the signal and balancing voltages which might result in insufficient torque on the switch motor and a "dead band" around the null point. This condition is corrected by decreasing the resistance of potentiometer 46, thereby boosting the input voltage to the amplifier 48.

Position 3 of the set-up switch 73 is a standby position of the analyzer. The servo switch 36A-B will be inoperative since the switch servo motor 37 is disconnected from the amplifier output, which is connected to a simulated load provided by a resistor 115. No counts will be recorded since section 73A of the set-up switch opens the analyzing circuit in all positions except position 4. The measuring instrument, however, is allowed to function normally.

The analyzer has been described with relation to a particular and specialized application, that is, weight measurements of continuous sheet material production. Other applications include: weight measurements of a continuous cigarette rod or textile sliver; moisture measurements of a sheet, cigarette rod or textile sliver; weight measurements of discontinuous units, such as, individual sheets of material, with the interrupter contacts arranged to operate when the sample is in position under the gauging head; measurement of density, pressure, viscosity or the like in liquids flowing through a pipe, with the interrupter contacts actuated by a flowmeter or other suitable means; to tally dimensional measurements of objects registered on an automatic measuring machine; to tally weights of packages and the like on an automatic weighing machine; and to obtain time base frequency distributions, where the pulser contacts are operated by a timer, for example, temperature measurements tallied once each minute. Other applications or combinations of the above mentioned applications will suggest themselves to those concerned with statistical methods of quality control.

Since certain changes may be made in the foregoing illustrative embodiment of the invention without departing from the scope thereof, it is intended that all matter shown in the accompanying drawings or described heretofore shall be interpreted as illustrative and not in a limited sense.

Various features of the invention which are believed to be new are set forth in the accompanying claims.

What is claimed is:

1. Apparatus for recording a statistical frequency distribution derived from automatic measurement of a property of interest in items of a material product successively inspected for the value of said property, comprising gauging means responsive to said property for providing an electrical signal voltage functional of said value, a selector switch having a plurality of spaced contacts and a wiper movable along said contacts, means for converting said voltage into a proportional positioning movement of said wiper, means for presenting said items successively to said gauging means for measurement thereby, means for generating an electrical pulse upon each such presentation of an item to said gauging means; a plurality of counters, one such counter corresponding to each value interval in said frequency distribution and each counter being adapted to be actuated by said pulses; and circuit means for routing each of said pulses into a preselected one of said counters as determined by the location of said wiper relative to said contacts at the instant the pulse is generated.

2. Apparatus as in claim 1 wherein said proportional movement is defined by the ratio $\Delta r/\Delta e$, where $\Delta e$ represents an incremental change in said signal voltage and $\Delta r$ represents a corresponding change in the position of said wiper, and wherein said voltage converting means includes means for adjusting the value of said ratio.

3. Apparatus as in claim 1 wherein said voltage converting means comprises a voltage source having output connections, a potentiometer having an adjustable element in circuit with said source, the position of said adjustable element determining the portion of the voltage provided by said source which is delivered to said output connections, motor means for driving said adjustable element, an amplifier responsive to any difference between said signal voltage and said voltage delivered to said output connections for energizing said motor means in a direction to reduce said voltage difference, and mechanical coupling means connecting said motor means to said wiper of said switch.

4. Apparatus as in claim 3 wherein said voltage source includes means for adjusting said voltage provided by said source.

5. Apparatus for recording a statistical frequency distribution derived from automatic measurement of a property of interest in items of a material product successively inspected for the value of said property, comprising gauging means responsive to said property for rendering an indication of the variable value thereof, adjustable means for setting an indication of a preselected value of said property, means responsive to the difference between said rendered indication and said set indication for providing an electrical signal voltage proportional to said difference, a selector switch having a plurality of spaced contacts and a wiper movable along said contacts, means for converting said voltage into a proportional positioning movement of said wiper, means for presenting said items successively to said gauging means for measurement thereby, means for generating an electrical pulse upon each such presentation of an item to said gauging means; a plurality of counters, one such counter corresponding to each value interval in said frequency distribution and each counter being adapted to be actuated by said pulses; and circuit means for routing each of said pulses into a preselected one of said counters as determined by the location of said wiper relative to said contacts at the instant the pulse is generated.

6. Apparatus as in claim 5 wherein said proportional movement is defined by the ratio $\Delta r/\Delta e$, where $\Delta e$ represents an incremental change in said signal voltage and $\Delta r$ represents a corresponding change in the position of said wiper, and wherein said voltage converting means includes means for adjusting the value of said ratio.

7. Apparatus as in claim 5 wherein said voltage converting means comprises a voltage source having output connections, a potentiometer having an adjustable element in circuit with said source, the position of said adjustable element determining the portion of the voltage provided by said source which is delivered to said output connections, motor means for driving said adjustable element, an amplifier responsive to any difference between said signal voltage and said voltage delivered to said output connections for energizing said motor means in a direction to reduce said voltage difference, and mechanical coupling means connecting said motor means to said wiper of said switch.

8. Apparatus as in claim 7 wherein said voltage source includes means for adjusting said voltage provided by said source.

9. Apparatus for recording a statistical frequency distribution derived from automatic measurement of a property of interest in items of a material product successively inspected for the value of said property, comprising gauging means responsive to said property for rendering an electrical signal voltage functional of said value, means for presenting said items successively to said gauging means for measurement thereby, means for generating an electrical pulse upon each such presentation of an item to said gauging means; a plurality of counters, one such counter corresponding to each value interval in said frequency distribution and each counter being adapted to be actuated by said pulses; a plurality of gates, one such gate corresponding to each of said counters and connecting the same to said pulse generating means and each gate having a control input for determining whether a pulse is blocked or routed to its connected counter in accordance with the presence or absence of a control signal on said control input; a first component of said control signal, a second component of said control signal, a plurality of means for combining said first and second components to provide said control signal, one such combining means being conencted to each of said gate control inputs so as to deliver said control signal thereto when both said first and second components are present at said combining means; a flip-flop circuit having first and second stable states, corresponding first and second outputs, and corresponding first and second trigger circuits, each of said outputs alternatively providing said first component of said control signal; means connecting said first output to alternate members of said combining means, means connecting said second output to the remaining members of said combining means, a selector switch having a first and a second switch section, each section having a plurality of spaced contacts grouped electrically by connection with a common conductor for each group, each group comprising at least one of said contacts and the number of groups in each section being at least equal to the number of said coutners; a first wiper on said first switch section, the width of said first wiper being less than sufficient to make connection with a member of two adjacent groups simultaneously as said wiper moves over said contacts; means for completing said first trigger circuit when said first wiper is in contact with a member of one of the alternate groups of contacts on said first switch section, means for completing said second trigger circuit when said first wiper is in contact with a member of one of the remaining groups of contacts on said first switch section; a source of said second component of said control signal, means connecting successive contact groups on said second switch section to successive members of said combining means; a second wiper on said switch section, said second wiper being conencted to said source of said second control signal component, the width of said second wiper being more than sufficient to make contact with a member of two of said contact groups simultaneously; and an electromechanical servomechanism for converting said signal voltage functional of said material property value into a proportional positioning movement of said first and second wipers.

10. Apparatus as in claim 9 wherein said gates comprise electronic discharge devices, each of said devices having an output electrode and another electrode common to said output electrode and said control input, and wherein all of said other electrodes are connected in circuit with said pulse source through a common load impedance whereby passage of a pulse through one of said devices develops a bias potential on all of said other electrodes with respect to said control inputs.

11. Apparatus as in claim 10 wherein said servomechanism comprises a voltage source having an output connection, a potentiometer having an adjustable element in circuit with said source, the position of said adjustable element determining the portion of the voltage provided by said source which is delivered to said output connection, motor means for driving said adjustable element, an amplifier responsive to any difference between said value-functional signal voltage and said voltage delivered to said output connection for energizing said motor means in a direction to reduce said voltage difference, and mechanical coupling means connecting said motor means to said wipers of said switch.

12. Apparatus as in claim 11 wherein said voltage source includes means for adjusting said voltage provided by said source.

References Cited in the file of this patent
UNITED STATES PATENTS

| | | |
|---|---|---|
| 2,123,142 | McMaster | July 5, 1938 |
| 2,398,988 | Ziebolz | Apr. 23, 1946 |
| 2,477,395 | Sunstein | July 26, 1949 |
| 2,497,961 | Shaw | Feb. 21, 1950 |
| 2,525,841 | Sturm | Oct. 17, 1950 |
| 2,912,163 | Tuyl | Nov. 10, 1959 |